Oct. 6, 1970     R. E. TALMO     3,532,869

MULTIPLIER INCLUDING TWO RESISTANCE BRIDGES

Filed Nov. 14, 1968     4 Sheets-Sheet 1

INVENTOR
ROBERT E. TALMO
BY
ATTORNEY

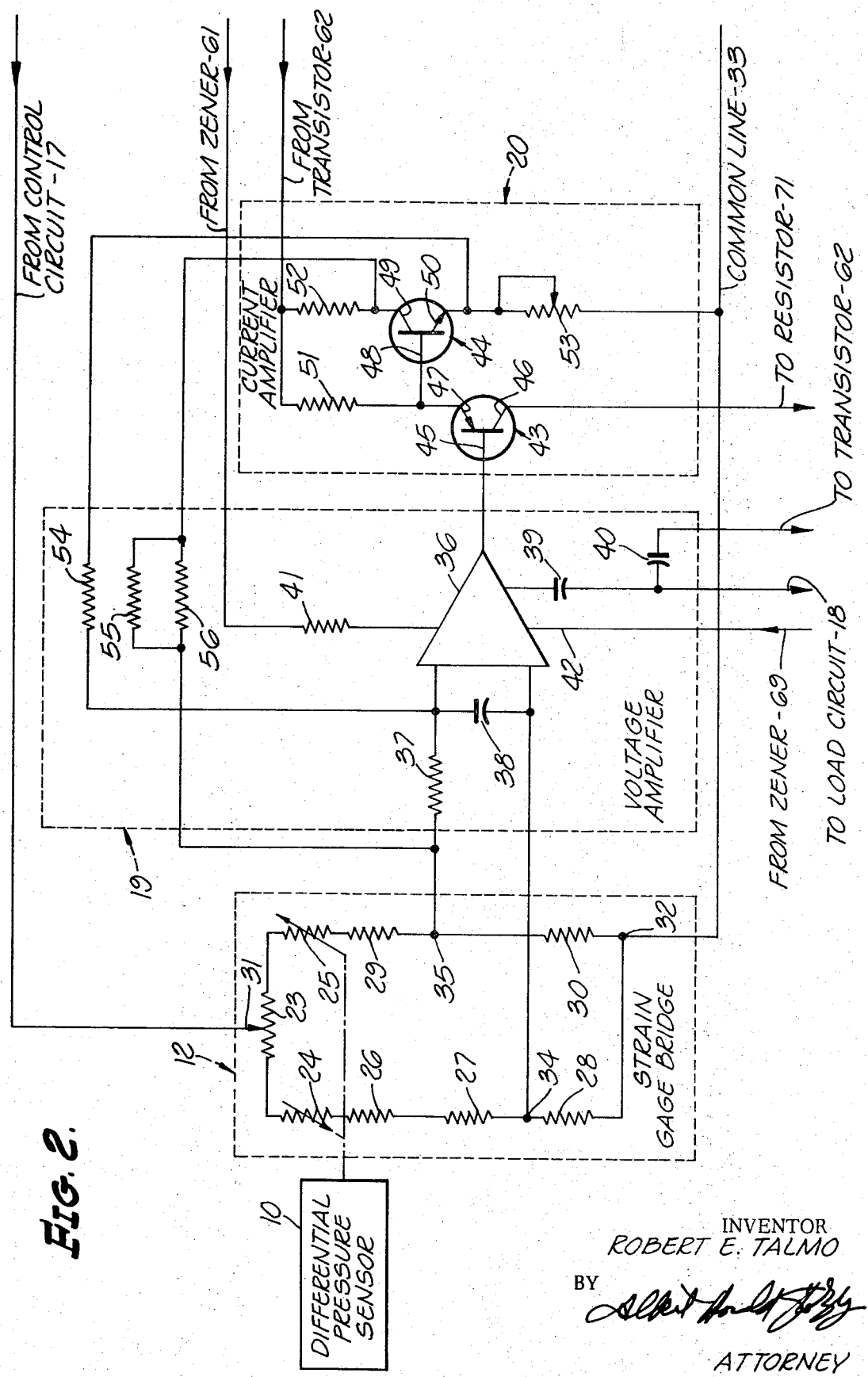

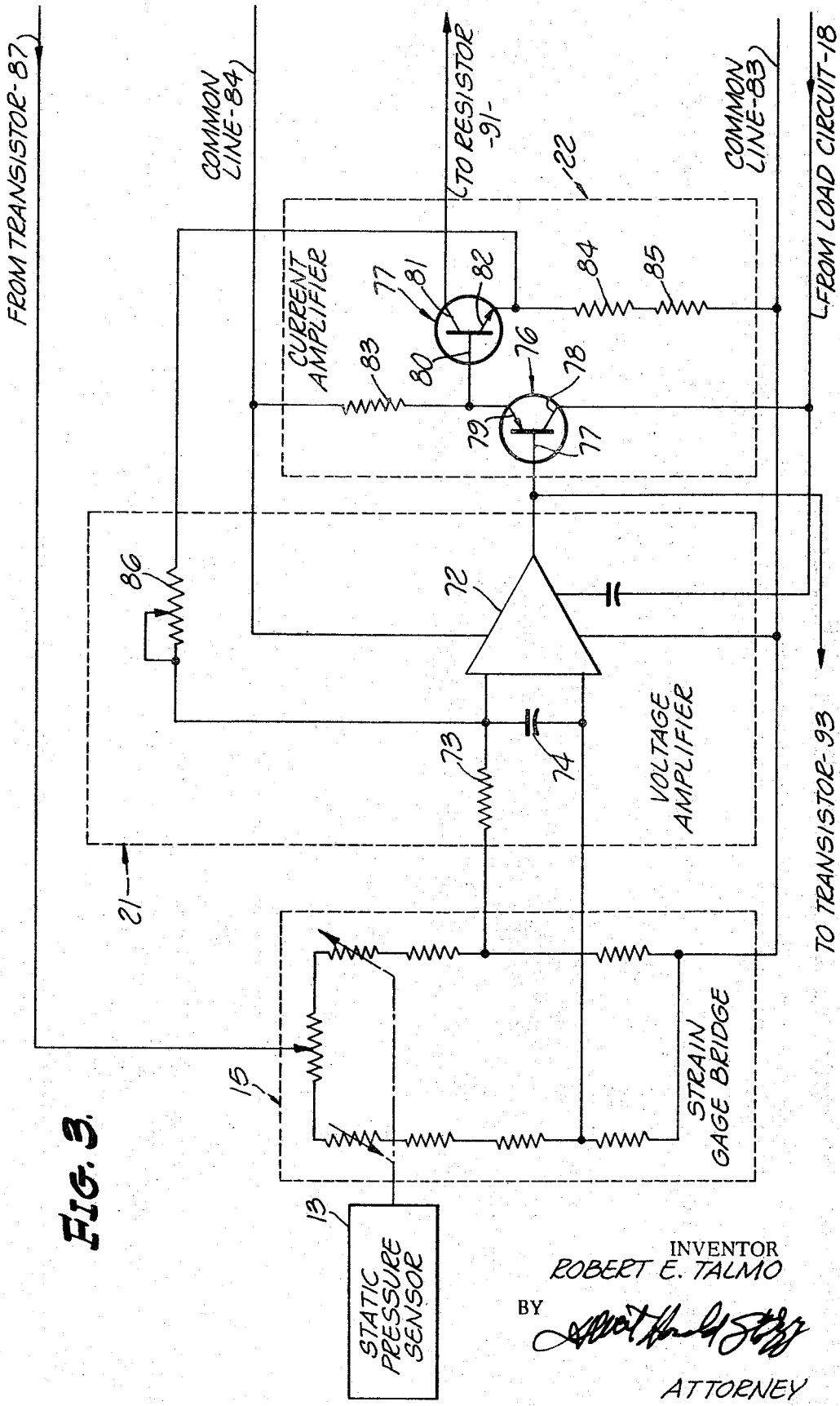

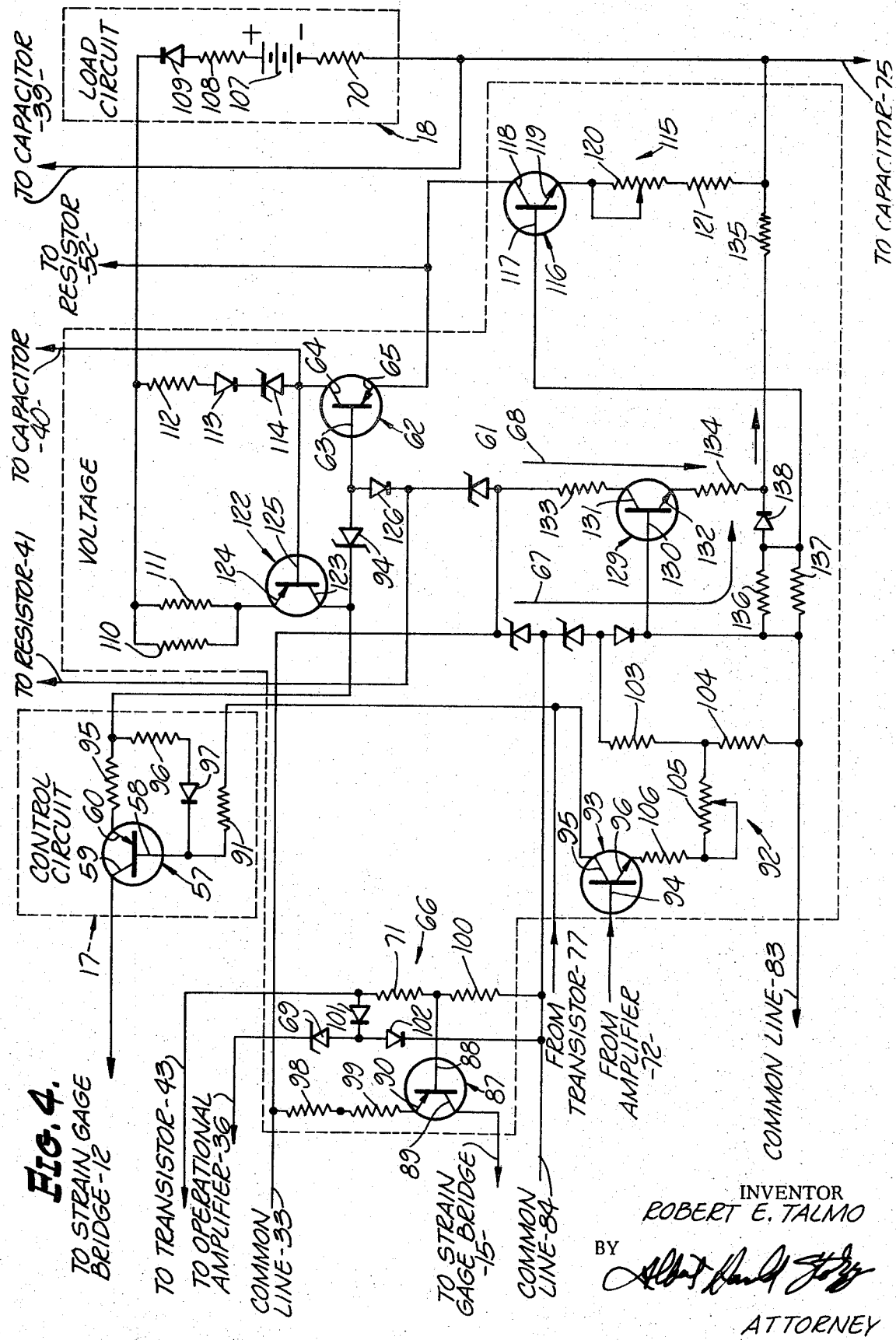

United States Patent Office 3,532,869
Patented Oct. 6, 1970

3,532,869
MULTIPLIER INCLUDING TWO RESISTANCE BRIDGES
Robert Eugene Talmo, Pasadena, Calif., assignor to International Telephone and Telegraph Corporation, New York, N.Y., a corporation of Delaware
Filed Nov. 14, 1968, Ser. No. 775,758
Int. Cl. G06g 7/16, 7/57
U.S. Cl. 235—194         3 Claims

ABSTRACT OF THE DISCLOSURE

The invention includes two resistance bridges with a pair of strain gages in each bridge. The strain gages in one bridge vary the output of the bridge in accordance with the static pressure in a flow line. The strain gages in the other bridge vary its ouput according to the differential pressure across an orifice in the same line. Total flow and flow rate are a function of the product of these two pressures. The invention produces an output current directly proportional to this product by varying the input to one bridge in accordance with the output of the other bridge.

BACKGROUND OF THE INVENTION

This invention relates to computing devices, and more particularly to a circuit for producing an output proportional to the product of two variables.

The device of the present invention will have applications other than those disclosed and should therefore not be limited to the ones shown and described therein. However, the invention has been found especially useful in performing part of the computation needed in determining the total flow of a fluid through an orifice.

The total fluid flow is a function of the product of static pressure and the differential pressure across the orifice.

In the past, it has been the practice to record static pressure and differential pressure, and to make a series of separate computations to determine flow.

SUMMARY OF THE INVENTION

In accordance with the device of the present invention, the above-described and other disadvantages of the prior art are overcome by providing a multiplier responsive to the outputs of static and differential pressure sensors to produce a continuous output in accordance with the product of the static and differential pressures. The time consuming computations of the prior art thus need not be made.

According to a special feature of the invention two strain gages are connected from one pressure sensor in a resistance bridge. The electrical input to the bridge is controlled in accordance with the other pressure sensed. The output of the bridge is then directly proportional to the product of both pressures.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIGS. 2, 3, and 4 are schematic diagrams of portions of the block diagram shown in FIG. 1.

DESCRIPTION OF THE PREFERRED EMBODIMENT

Figure 1:
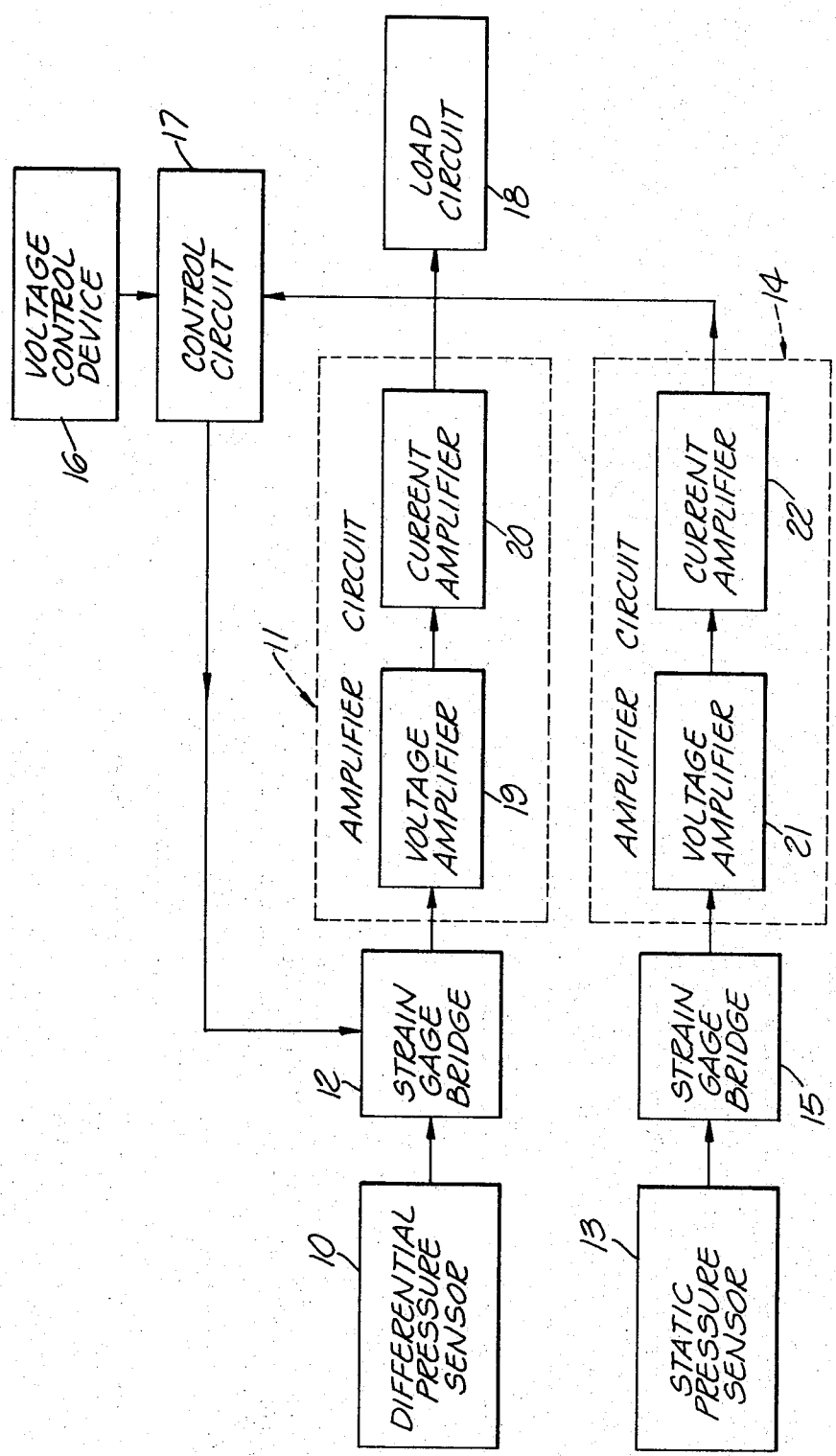
FIG. 1 is a block diagram of the multiplier of the invention.

In the drawings, in FIG. 1, a differential pressure sensor 10 is shown connected to an amplifier circuit 11 through a strain gage bridge 12. Similarly, a static pressure sensor 13 is connected to amplifier circuit 14 through a strain gage bridge 15.

Supply voltages are provided by a voltage control device 16.

Current is supplied to bridge 12 by a control circuit 17. The amount of current supplied to bridge 12 by circuit 17 is directly proportional to the output of circuit 14. The output of the circuit 14 is directly proportional to static pressure. The output of circuit 11 is impressed upon load circuit 18.

Were bridge 12 supplied with a constant current, the output of circuit 11 would be directly proportional to differential pressure. However, circuit 17 provides a variable input current to bridge 12 which causes the output of circuit 11 to vary directly proportional to the product of the static and differential pressures.

Sensors 10 and 13 may be identical to the sensor disclosed in co-pending U.S. patent application, Ser. No. 630,575 filed April 13, 1967, for an Analog Converter by Robert E. Talmo and Thomas H. Lee, Alternatively, sensors 10 and 13 may be conventional.

Amplifier circuit 11 contains both a voltage amplifier 19 and a current amplifier 20. Amplifier circuit 14 contains a voltage amplifier 21 and a current amplifier 22. The details of these and other blocks shown in FIG. 1 are illustrated in FIGS. 2, 3, and 4.

In FIG. 2, bridge 12 has an input potentiometer 23, strain gages 24 and 25, and fixed resistors 26, 27, 28, 29, and 30. Potentiometer 23 has a wiper 31 which forms one corner of the bridge. Another corner 32 is connected to a common line 33. The ouput of the bridge is taken from corners 34 and 35 and impressed upon a conventional operational amplifier 36 in voltage amplifier 19. A resistor 37 is connected from bridge 12 to amplifier 36. A capacitor 38 is connected in parallel with the input. Amplifier 36 has capacitors 39 and 40 to control its dynamic response. Voltages are supplied to amplifier 36 through a resistor 41 and a lead 42.

Current amplifier 20 has transistors 43 and 44. Transistor 43 has a base 45, a collector 46, and an emitter 47. Transistor 44 has a base 48, a collector 49, and an emitter 50. The output of amplifier 36 is connected to transistor base 45. A resistor 51 is connected from resistor 52 to emitter 47. Resistor 52 is connected to collector 49. Base 48 is connected to emitter 47. A potentiometer 53 is connected from emitter 50 to common line 53.

A feedback resistor 54 is provided in amplifier 19 connected from emitter 50 to input of amplifier 36. Resistors 55 and 56 are connected from collector 49 to bridge 12. Connections to the circuit elements shown in FIG 2 will now be described.

Control circuit 17 shown in FIG. 4 includes a transistor 57 having a base 58, a collector 59, and an emitter 60. Collector 59 is connected to wiper 31 of potentiometer 23 in bridge 12.

Resistor 41 and amplifier 19 are connected from a Zener diode 61 in device 16, shown in FIG. 4.

Device 16 has a transistor 62 with a base 63, a collector 64, and an emitter 65. Resistor 52 shown in amplifier 20, is connected from transistor emitter 65.

Common line 33 shown in FIG. 2 is connected to a span temperature compensation circuit 66 in device 16 and to paths 67 and 68 in device 16. Lead 42 to amplifier 36 is connected from a Zener diode 69 in circuit 66 shown in FIG. 4. Load circuit 18 has a resistor 70 connected to capacitor 39. Capacitor 40 is connected to capacitor 39. Capacitor 40 is connected from transistor collector 64 to device 16.

Circuit 66 has a resistor 71 connected to the collector 46 and a transistor 43 in amplifier 20.

As shown in FIG. 3, bridge 15 is identical to bridge 12 and will not be described for that reason. Voltage amplifier 21 includes an operational amplifier 72 identical to amplifier 36. Both amplifiers 36 and 72 are described in said co-pending application. Amplifier 21 has a resistor 73 and a capacitor 74 identical to resistor 37 and capacitor 38 in amplifier 19. Amplifier 21 also has capacitor 75 similar to capacitor 39. The output of amplifier 72 is connected to amplifier 22. Amplifier 22 includes transistors 76 and 77. Transistor 76 has a base 77, a collector 78, and an emitter 79. Transistor 77 has a base 80, a collector 81, and an emitter 80. Emitter 79 is connected through resistor 83 to common line 84. Base 77 is connected from amplifier 72. Capacitor 75 and collector 78 are connected to load circuit 18. Base 80 is connected to emitter 79. Emitter 82 is connected to common line 83 through resistors 84 and 85. Emitter 82 is connected to the input of amplifier 72 through a feedback potentiometer 86 in amplifier 21.

Circuit 66 shown in FIG. 4 includes a transistor 87, having a base 88, a collector 89, and an emitter 90. Collector 89 is connected to base 15. Collector 81 of transistor 77 is connected to an input resistor 91 in circuit 17, shown in FIG. 4. Device 16 has a second span temperature compensation circuit 92. Circuit 92 includes a transistor 93, having a base 94, a collector 95, and an emitter 96. Base 94 is connected from amplifier 72.

As shown in FIG. 4, a Zener diode 94 in device 10 is connected to resistors 95 and 96 in circuit 17. A diode 97 is connected from resistor 96 to transistor base 58.

Circuit 66 has resistors 98 and 99 connected from emitter 90 to common line 33. Resistors 71 and 100 are connected from transistor 43 to common line 84. The same is true of diodes 101 and 102.

Circuit 92 includes resistors 103 and 104 connected from a diode 105 in device 16 to common line 83. A potentiometer 105 and a resistor 106 are connected from the junction of resistors 103 and 104 to transistor emitter 96.

Load circuit 18 includes resistor 70, a battery 107, a resistor 108, and a diode 109 connected serially together. Battery 107 supplies current to device 16 through resistors 110, 111, and 112. A diode 113 is connected from resistor 112 through a Zener diode 114 to transistor collector 64.

Device 16 also includes a linearity compensation circuit 115 having a transistor 116 with a base 117, a collector 118, and an emitter 119. Collector 118 is connected from transistor emitter 65. Emitter 119 is connected through a potentiometer 120 and a resistor 121 to load circuit 18.

Device 10 includes a transistor 122 having a collector 123, an emitter 124 and a base 125. Base 125 is connected from collector 67. Emitter 124 is connected from resistors 110 and 111. Collector 123 is connected to Zener diode 124. A diode 126 is connected from Zener 94 to Zener 61. Base 62 is connected from diode 126. Zeners 127 and 128 are connected from Zener 61. Device 16 includes a transistor 129 having a base 130, a collector 131, and an emitter 132. Collector 131 is connected from Zener 61 through a resistor 133. Emitter 132 is connected to load circuit 18 through resistors 134 and 135. Common line 83 is connected to load circuit 18 through resistors 136 and 137 and through a diode 138 and resistor 135.

In the operation of the circuit shown in FIGS. 2, 3, and 4, were the current supplied to potentiometer wiper 31 in bridge 12 constant, the output of bridge 12 would be proportional to differential pressure. The output of bridge 15 is directly proportional to static pressure. The connection from collector 81 in amplifier 22 then controls the current output of circuit 17 through resistor 91 to vary the current input to bridge 12 at potentiometer 23. The current then supplied to load circuit 18 is proportional to the product of differential pressure and static pressure.

Circuit 66 compensates for changes in temperature insofar as temperature affects the output of static pressure strain gage bridge 15. Diodes 101 and 102 sense ambient temperature. Diode 105 in device 16 similarly senses ambient temperature for circuit 92 for differential pressure temperature compensation.

Circuit 115 compensates for non-linearity in sensor operation.

Except for circuits 66, 92, and 115, device 16 primarily supplies regulated voltages to the other circuits. However, the device 16 is also employed to supply a substantially constant current of 4 milliamperes in path 67. Additional current is added through path 68 directly proportional to the product of the differential and static pressures.

The identification of circuit components and values is as follows.

Potentiometer:
- 23 _____ 100 ohms.
- 53 _____ 100 ohms.
- 86 _____ 40,000 ohms.
- 105 _____ 5,000 ohms.
- 120 _____ 5,000 ohms.

Resistor:
- 27 _____ 50 ohms.
- 28 _____ 1,500 ohms.
- 30 _____ 1,680 ohms.
- 37 _____ 1,000 ohms.
- 41 _____ ½ watt, 820 ohms ±5%.
- 51 _____ ½ watt, 13,000 ohms ±5%.
- 52 _____ ½ watt, 100 ohms ±5%.
- 54 _____ ½ watt, 20,000 ohms ±5%.
- 56 _____ ½ watt, 10 megohms ±5%.
- 70 _____ 0–850 ohms.
- 73 _____ 1,000 ohms.
- 83 _____ ½ watt, 18,000 ohms ±5%.
- 84 _____ 6,600 ohms.
- 85 _____ 33 ohms.
- 91 _____ 100 ohms.
- 95 _____ 4,600 ohms.
- 96 _____ 14,000 ohms.
- 98 _____ 3,500 ohms.
- 99 _____ 500 ohms.
- 106 _____ 18,000 ohms.
- 108 _____ 5 ohms.
- 111 _____ 2,200 ohms.
- 112 _____ ½ watt, 51 ohms ±5%.
- 121 _____ ½ watt, 200 ohms ±5%.
- 133 _____ ½ watt, 510 ohms ±5%.
- 134 _____ ½ watt, 10 ohms ±5%.
- 135 _____ ½ watt, 20 ohms ±5%.
- 136 _____ ½ watt, 51 ohms ±5%.

Capacitor:
- 38 _____ 0.1 mfd. ±5%.
- 39 _____ 0.1 mfd. ±5%.
- 40 _____ 0.01 mfd. ±5%.
- 74 _____ 0.1 mfd. ±5%.
- 75 _____ 0.022 mfd. ±5%.

Transistor:

| | |
|---|---|
| 43 | 2N3644. |
| 44 | 2N3566. |
| 57 | 2N4250. |
| 62 | 2N1711. |
| 76 | 2N4250. |
| 77 | 2N3565. |
| 87 | 2N4250. |
| 93 | 2N3565. |
| 116 | 2N3568. |
| 123 | 2N3644. |
| 129 | 2N3568. |

Diode:

| | |
|---|---|
| 97 | 1N457. |
| 101 | 1N774. |
| 102 | 1N774. |
| 105 | 1N774. |
| 109 | 1N457. |
| 113 | 1N774. |
| 126 | 1N457. |
| 138 | 1N774. |

Battery 107 _____ 38–55 v. DC.

Zener:

| | |
|---|---|
| 61 | Transistor 2N3638. |
| 69 | Transistor 2N3639. |
| 94 | Transistor 2N3563. |
| 114 | Transistor 2N3638. |
| 127 | Transistor 2N3638. |
| 128 | Transistor 2N3563. |

The Zeners employed may actually be transistors of which only two terminals are used. Reverse breakdown is obtained in the direction indicated. That is "collector-emitter" means the collector is maintained positive with respect to the emitter in a PNP type transistor. Thus:

Zener 61 (collector-emitter-PNP)
Zener 69 (base-emitter-PNP)
Zener 94 (emitter-base-NPN)
Zener 114 (collector-emitter-PNP)
Zener 127 (collector-emitter-PNP)
Zener 128 (emitter-base-NPN)

Many changes and modifications will suggest themselves to those skilled in the art. The invention is therefore, not to be limited to the single specific embodiment illustrated and described, the true scope of the invention being defined only in the appended claims.

What is claimed is:

1. An analog multiplier comprising: a first signal source; first means for producing a first output signal in accordance with the output of said first source; a voltage control device; a second signal source including a first resistance bridge; and a control circuit responsive to said first output signal for controlling current from said device to said first bridge in a manner such that the output of said first bridge varies in accordance with the product of the outputs of said sources, a load circuit; second means responsive to the output of said first bridge for supplying an input to said load circuit in accordance with said product; and third means to actuate said sources, said output of said second means being connected to first and second parallel paths through said voltage control device, said first path including a Zener diode and a resistor, said second path including a transistor having its collector-emitter circuit connected serially therewith, said transistor having a base connected from said resistor, said first path supplying a substantially constant current, said second path supplying a current in accordance with said product.

2. The invention as defined in claim 1, wherein said first bridge includes two variable resistances connected in two corresponding adjacent legs and two fixed resistances connected in the other two adjacent legs, said control circuit being connected between the corners of said first bridge at the mutual connections of said adjacent legs thereof, the other two corners of said first bridge being connected to said second means.

3. The invention as defined in claim 2, wherein said first source includes a second resistance bridge, said first means including a first voltage amplifier connected from said second bridge and a first current amplifier connected from said voltage control device including a voltage regulator, said control circuit being connected from said voltage regulator to said first bridge, said voltage control device including a first temperature compensation circuit connected from said regulator to said second bridge, said device including a second temperature compensation circuit connected from said first current amplifier to said control circuit, said device also including a linearity compensation circuit connected from said regulator to said load circuit to compensate for non-linearity introduced by said third means, said second means including a second voltage amplifier connected from said first bridge, and a second current amplifier connected from said second voltage amplifier.

References Cited

UNITED STATES PATENTS

| | | | |
|---|---|---|---|
| 3,070,309 | 12/1962 | Fluegel | 235—179 X |
| 3,117,242 | 1/1964 | Slack | 235—194 X |
| 3,218,445 | 11/1965 | Fluegel | 235—179 X |
| 3,308,287 | 3/1967 | Levy et al. | 235—194 |
| 3,414,721 | 12/1968 | Oliver | 235—195 |

MALCOLM A. MORRISON, Primary Examiner

J. F. RUGGIERO, Assistant Examiner

U.S. Cl. X.R.

235—179, 151.34